(12) United States Patent
Souryavongsa et al.

(10) Patent No.: US 12,025,030 B2
(45) Date of Patent: Jul. 2, 2024

(54) BLADE COMPRISING A STRUCTURE MADE OF COMPOSITE MATERIAL AND ASSOCIATED MANUFACTURING METHOD

(71) Applicant: Safran Aircraft Engines, Paris (FR)

(72) Inventors: Eddy Keomorakott Souryavongsa, Moissy-Cramayel (FR); Anthony Binder, Moissy-Cramayel (FR); Vivien Mickaël Courtier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/910,514

(22) PCT Filed: Mar. 11, 2021

(86) PCT No.: PCT/FR2021/050413
§ 371 (c)(1),
(2) Date: Sep. 9, 2022

(87) PCT Pub. No.: WO2021/181045
PCT Pub. Date: Sep. 16, 2021

(65) Prior Publication Data
US 2023/0027670 A1 Jan. 26, 2023

(30) Foreign Application Priority Data
Mar. 11, 2020 (FR) ...................... 2002425

(51) Int. Cl.
*F01D 5/32* (2006.01)
*B29D 99/00* (2010.01)
(Continued)

(52) U.S. Cl.
CPC ......... *F01D 5/282* (2013.01); *B29D 99/0025* (2013.01); *B64D 27/10* (2013.01); *F01D 5/32* (2013.01)

(58) Field of Classification Search
CPC ............. F01D 5/32; F01D 5/326; F01D 5/282
See application file for complete search history.

(56) References Cited

U.S. PATENT DOCUMENTS 3,869,221 A 3/1975 Wildner
4,968,217 A 11/1990 Newton
(Continued)

FOREIGN PATENT DOCUMENTS

CA 930670 A 7/1973
FR 3 080 322 A1 10/2019

OTHER PUBLICATIONS

French Search Report for French Application No. 2002425, dated Nov. 25, 2020.
(Continued)

*Primary Examiner* — Michael L Sehn
(74) *Attorney, Agent, or Firm* — Birch, Stewart, Kolasch & Birch, LLP

(57) ABSTRACT

The present invention relates to a blade comprising: —a structure made of composite material; —a blade root attachment part comprising a wall delimiting a cavity, a first opening formed in the wall and a second opening located under the blade root portion, the structure made of composite material extending through the first opening; —two locking parts configured to axially abut against a shoulder of the attachment part and to bear against the blade root portion; and —a cover for compressing the blade root portion against the locking parts.

10 Claims, 8 Drawing Sheets

(51) Int. Cl.
*B64D 27/10* (2006.01)
*F01D 5/28* (2006.01)

(56) References Cited

U.S. PATENT DOCUMENTS

| | | | |
|---|---|---|---|
| 6,071,076 A | 6/2000 | Ansari et al. | |
| 9,080,454 B2* | 7/2015 | Coupe | C04B 35/62873 |
| 11,131,197 B2 | 9/2021 | Courtier et al. | |
| 2020/0199033 A1* | 6/2020 | Shim | C04B 35/62868 |

OTHER PUBLICATIONS

International Search Report for International Application No. PCT/FR2021/050413, dated Jul. 2, 2021.

* cited by examiner

BLADE COMPRISING A STRUCTURE MADE OF COMPOSITE MATERIAL AND ASSOCIATED MANUFACTURING METHOD

TECHNICAL FIELD

The disclosure relates to a blade comprising a structure made of composite material.

The disclosure relates more particularly, but not exclusively, to a blade intended to be used in an aircraft engine unducted fan rotor (such as an "Open Rotor" engine (i.e. for which the fan is not ducted having two rotating propellers or an "Unducted Single Fan" (USF) engine having a moving blading and a fixed blading or a turboprop having an architecture with a single propeller) or in a wind turbine rotor.

BACKGROUND

The advantage of unducted fan engines is that the diameter of the fan is not limited by the presence of a fairing, so that it is possible to design an engine having a high bypass ratio, and consequently a reduced fuel consumption.

Thus, in this type of engine, the fan blades can have a large span.

Moreover, these engines generally comprise a mechanism for modifying the pitch angle of the blades in order to adjust the power generated by the fan as a function of the different flight phases.

However, the design of such blades requires opposing constraints to be taken into account.

On the one hand, the dimensioning of these blades must allow optimum aerodynamic performance (maximising the efficiency and delivering the thrust while minimising losses). The improvement in aerodynamic performance of the fan tends towards an increase in the bypass ratio (BPR); this is manifest by an increase in the outer diameter and therefore in the span of these blades.

On the other hand, it is also necessary to guarantee withstanding of the mechanical stresses which can be exerted on these blades while limiting their acoustic signature.

Furthermore, on unducted fan architectures, the engine is generally started with a very open pitch. More particularly, a very open pitch allows the power to be consumed by the torque, which ensures mechanical safety by guaranteeing low fan speeds.

However, with a very open pitch, the blades are subject to a turbulent aerodynamic flow that is completely detached, which generates a wide-band vibrational excitation. In particular on wide chord and large span blades, the bending force is intense, even though the engine speed is not maximum.

In normal operation, during the phases on the ground and in flight, the pitch is changed (the pitch angle is more closed). The aerodynamic flow is thus perfectly clean (reattached to the aerodynamic profile). The wide-band stresses disappear, the rotation speed being higher, and the bending force is controlled.

Currently, these blades are generally produced from metal material. Although metal blades have good mechanical strength, they however have the disadvantage of a relatively large mass.

In order to reduce this mass, it is desirable to be able to manufacture these blades from composite material. However, the intense aerodynamic forces to which these blades will be subjected risks damaging the blade and/or the hub in the interface region between these blades and the hub of the fan rotor. This problem arises, more particularly, when the blades are connected to the hub by means of pinned fasteners, due to the level of vibration on engine orders AN, 2N and 3N.

SUMMARY

An object of the present application is to propose a blade including a composite material, suitable for being used with a variable pitch mechanism and in an "Open Rotor" environment, while being capable of withstanding intense aerodynamic forces, under the constraint of a limited size and a minimum mass.

For this purpose, a first aspect proposes a blade comprising:
- a structure made of composite material comprising a fibrous reinforcement obtained by three-dimensional weaving and a matrix in which the fibrous reinforcement is embedded, the structure made of composite material comprising an aerofoil portion with aerodynamic profile and a blade root portion;
- a blade root attachment part comprising a wall delimiting a cavity, a first opening formed in the wall and a second opening located under the blade root portion, on an opposite side of the attachment part relative to the first opening, the structure made of composite material extending through the first opening such that the aerofoil portion is located outside the attachment part and the blade root portion is located inside the cavity, the attachment part further comprising a shoulder extending into the cavity from the wall;
- two locking parts, each locking part having an upper surface configured to axially abut against the shoulder and a lower surface inclined relative to the upper surface and configured to bear against the blade root portion; and
- a cover, fixed on the attachment part at the second opening such that the blade root portion is compressed between the cover and the locking parts, at least one recess being formed in the shoulder, each locking part being housed in the at least one recess.

Some preferred, but non-limiting, features of the blade according to the first aspect are the following, taken individually or in combination:
- the locking parts bear against the recess, at least one recess is formed in the shoulder, each locking part being housed in the at least one recess;
- the shoulder has a radial surface extending opposite the blade root portion and each locking part comprises a tab extending from its upper surface, said tab being configured to radially abut against the radial surface of the shoulder; and/or
- the fibrous reinforcement comprises an aerofoil fibrous reinforcement portion and a blade root fibrous reinforcement portion, and in which each blade root fibrous reinforcement portion is woven continuously with the aerofoil fibrous reinforcement portion.

According to a second aspect, it is proposed a method for manufacturing a blade according to the first aspect, from a fibrous reinforcement obtained by three-dimensional weaving, the fibrous reinforcement comprising an aerofoil fibrous reinforcement portion and a blade root fibrous reinforcement portion, the method comprising the steps of:
- producing the blade root attachment part so as to form the cavity and the shoulder;

placing the fibrous reinforcement in the attachment part through the opening so that the aerofoil fibrous reinforcement portion is located outside the attachment part, beyond the first opening, and so that a part of the blade root fibrous reinforcement portion is located outside the attachment part, beyond the second opening;

placing the locking parts in the cavity such that their upper surface axially abuts against the shoulder;

placing the fibrous reinforcement in the attachment part such that the blade root fibrous reinforcement portion is located inside the attachment part and bears against the inclined lower surface of the locking parts; and fixing the cover on the attachment part at the second opening by compressing the blade root portion between the cover and the locking parts.

Some preferred, but non-limiting, features of the method for manufacturing a blade according to the second aspect are the following, taken individually or in combination:

the method further comprises a step of placing the fibrous reinforcement in a mould and injecting plastic material into the mould in such a way as to form the structure made of composite material comprising the fibrous reinforcement and a matrix in which the fibrous reinforcement is embedded prior to the placement step S3;

the method further comprises a step of placing the assembly formed of the fibrous reinforcement, attachment part and locking parts in a mould and a step of injecting plastic material into the mould in such a way as to form the structure made of composite material comprising the fibrous reinforcement and a matrix in which the fibrous reinforcement is embedded prior to step S6 of fixing the cover; and/or the method further comprises a step of placing temporary protective pieces against the fibrous reinforcement root portion and/or at the second opening prior to the step of placing the assembly in a mould and a step of withdrawing said temporary protective pieces prior to the step of fixing the cover.

According to a third aspect, it is proposed a gas turbine engine comprising a fan, the fan comprising a hub and blades extending radially from the hub, the blades being according to the first aspect, each blade being mounted to rotate relative to the hub about a respective pitch axis, the engine further comprising an actuating mechanism that can be controlled in order to rotate the blades about their pitch axes in such a way as to change the pitch angle of the blades.

According to a fourth aspect, it is proposed an aircraft comprising a gas turbine engine according to the third aspect.

According to a fifth aspect, it is proposed a blade comprising:

a structure made of composite material comprising a fibrous reinforcement obtained by three-dimensional weaving and a matrix in which the fibrous reinforcement is embedded, the structure made of composite material comprising an aerofoil portion with aerodynamic profile and a blade root portion;

a blade root attachment part comprising a wall delimiting a cavity, a first opening formed in the wall and a second opening located under the blade root portion, on an opposite side of the attachment part relative to the first opening, the structure made of composite material extending through the first opening such that the aerofoil portion is located outside the attachment part and the blade root portion is located inside the cavity, the attachment part further comprising a shoulder, extending into the cavity from the wall;

two locking parts, each locking part having an upper surface configured to axially abut against the shoulder and a lower surface inclined relative to the upper surface and configured to bear against the blade root portion; and a cover, fixed on the attachment part at the second opening such that the blade root portion is compressed between the cover and the locking parts;

the shoulder having a radial surface extending opposite the blade root portion and each locking part comprising a tab extending from its upper surface, said tab being configured to radially abut against the radial surface of the shoulder.

DESCRIPTION OF THE FIGURES

Other features, aims and advantages of the invention will emerge from the following description, which is given purely by way of illustration and not being limiting and which should be read with reference to the attached drawings, in which.

In all the figures, similar elements have identical reference signs.

DETAILED DESCRIPTION

Figure 1:
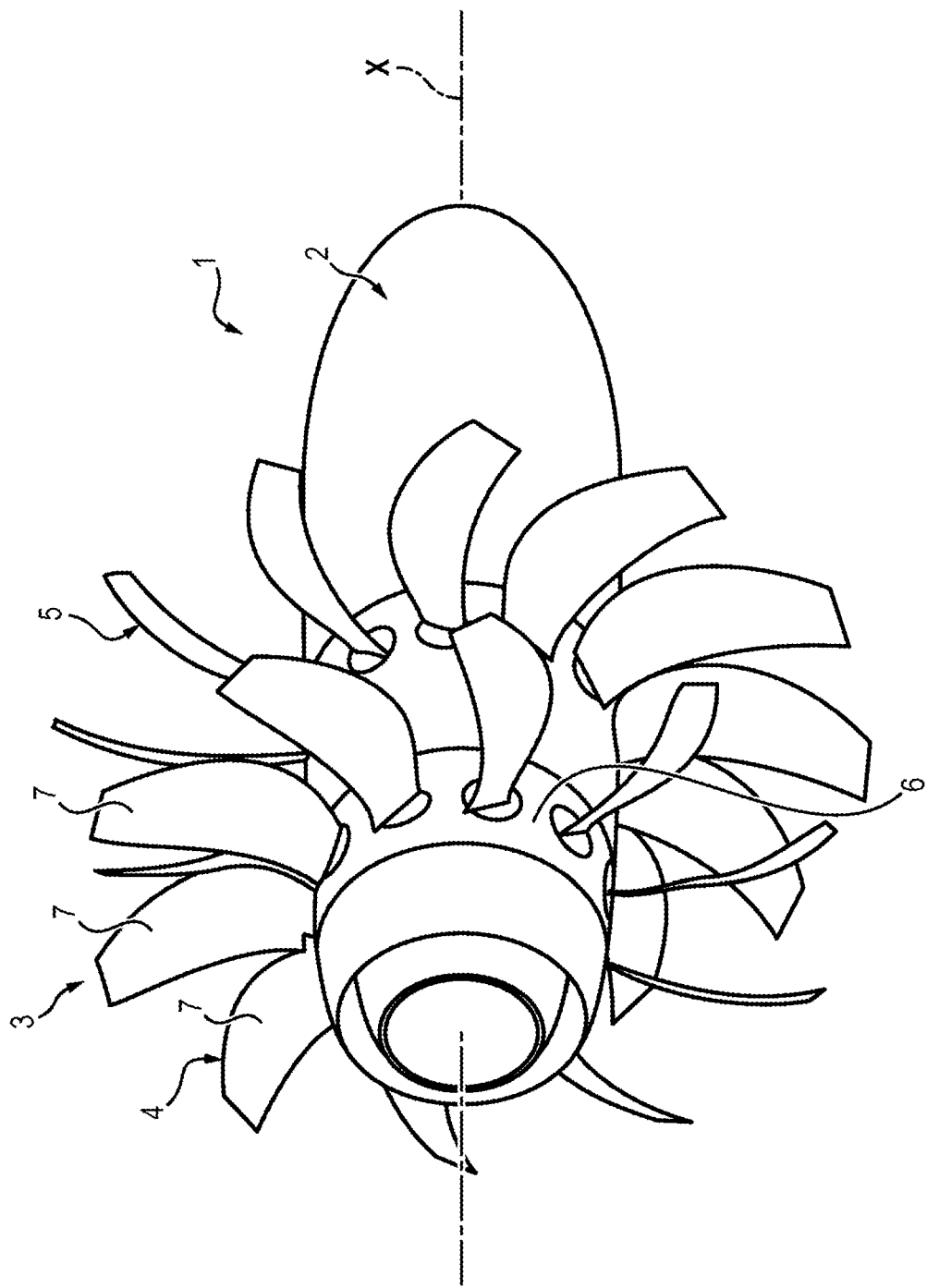
FIG. 1 schematically shows an exemplary engine including an unducted fan.

In FIG. 1, the engine 1 shown is an "Open Rotor" engine, in a configuration commonly referred to as a "pusher" configuration (i.e. the unducted fan is placed behind the power generator with an air inlet located on the side, to the right in FIG. 1).

The engine comprises a nacelle 2 intended to be fixed to a fuselage of an aircraft, and an unducted fan 3. The fan 3 comprises two counter-rotating fan rotors 4 and 5. In other words, when the engine 1 is in operation, the rotors 4 and 5 are rotated relative to the nacelle 2 about a same axis of rotation X (which coincides with the main axis of the engine), in opposite directions.

In the example illustrated in FIG. 1, the engine 1 is an "Open Rotor" engine in "pusher" configuration with counter-rotating fan rotors. However, the invention is not limited to this configuration. The invention also applies to "Open Rotor" engines in "puller" configuration (i.e. the fan is placed upstream of the power generator with its air inlet located in front, between or just behind the two fan rotors).

In addition, the invention also applies to engines having different architectures, such as an architecture comprising a fan rotor comprising moving blades and a fan stator comprising fixed blades, or even a single fan rotor.

The invention is applicable to turboprop architectures (comprising a single fan rotor).

In FIG. 1, each fan rotor 4, 5 comprises a hub 6 mounted to rotate relative to the nacelle 2 and a plurality of blades 7 fixed to the hub 6. The blades 7 extend substantially radially relative to the axis of rotation X of the hub.

Figure 2:
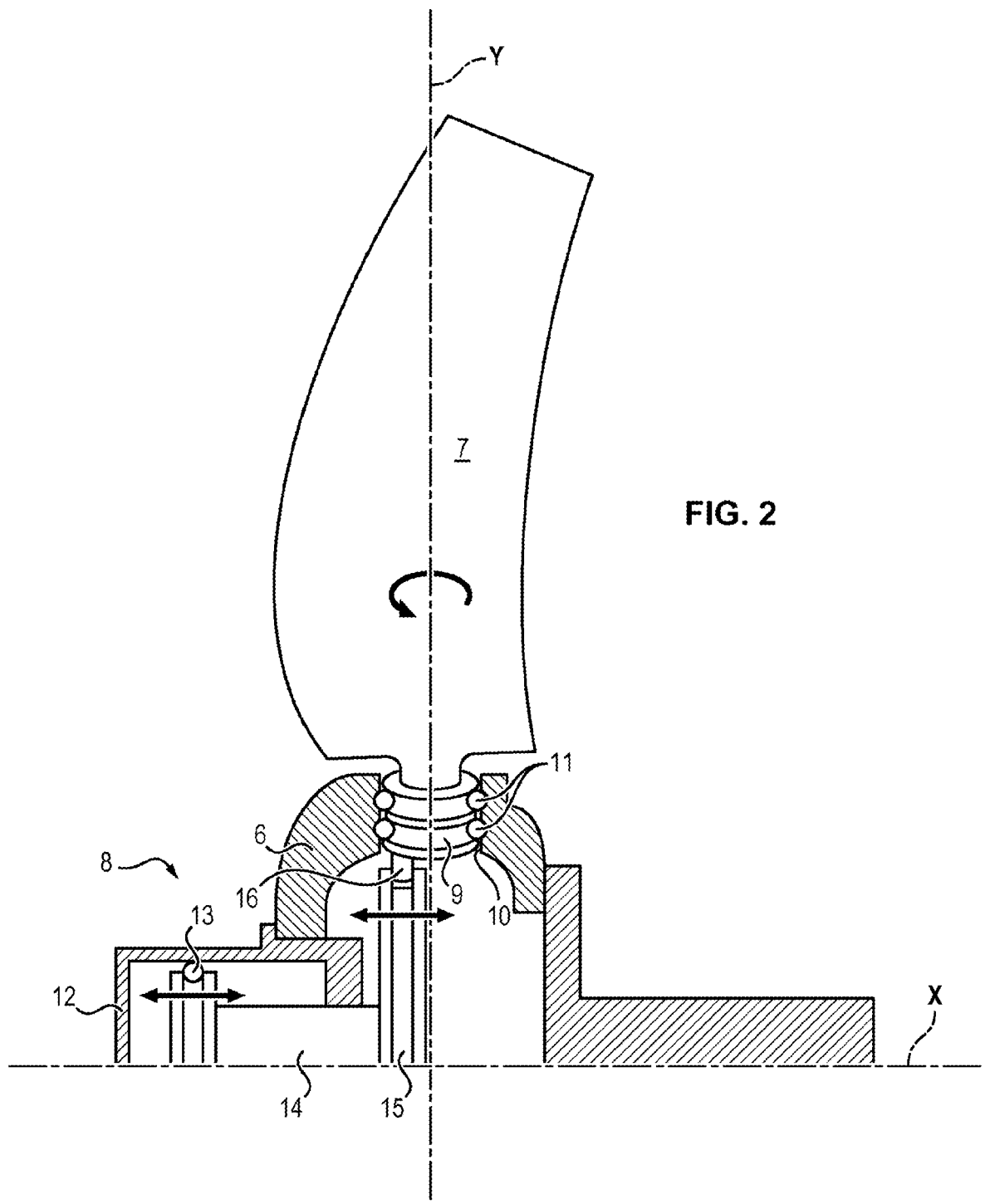
FIG. 2 schematically shows a fan blade and an actuating mechanism for changing the pitch angle of the fan blades.
Figure 4:
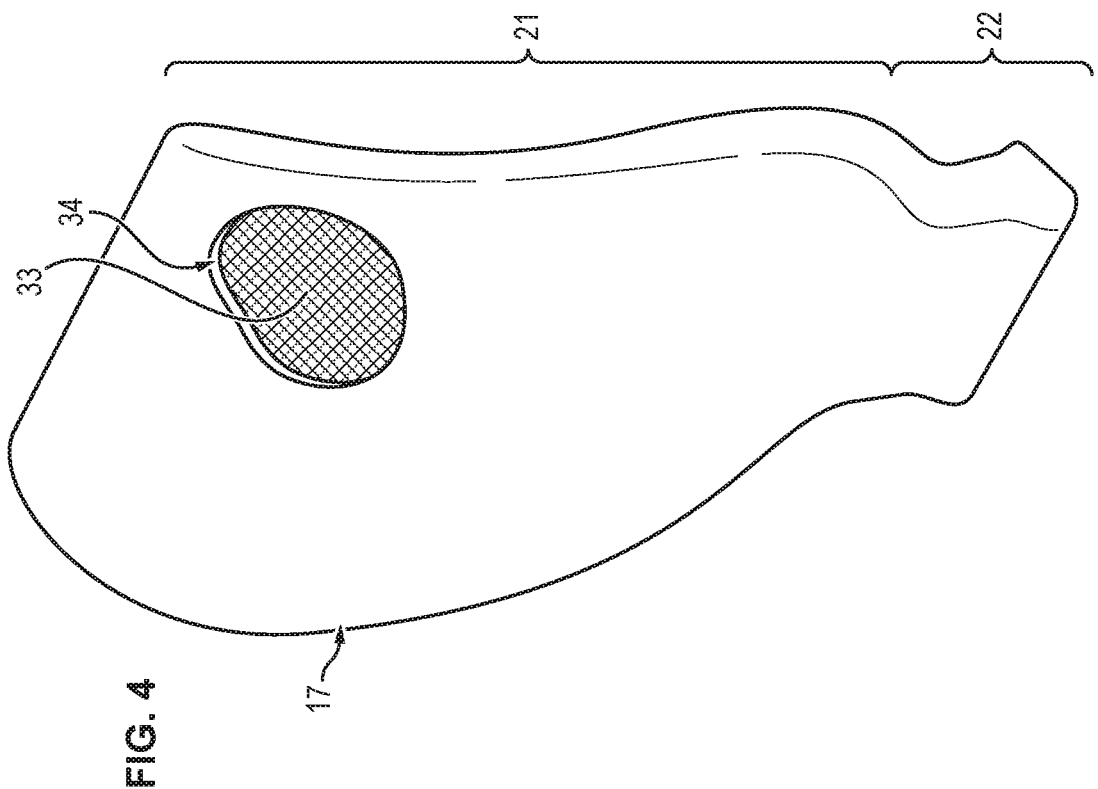
FIG. 4 schematically shows a structure made of composite material forming part of the blade.
Figure 3:
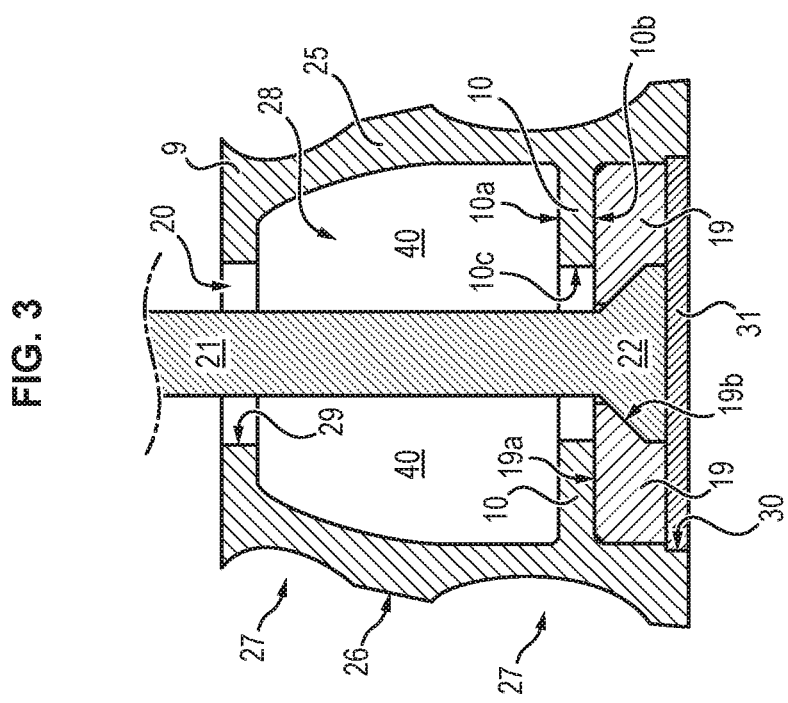
FIG. 3 is a schematic sectional view of a fan blade according to a first embodiment of the invention.
Figure 5:
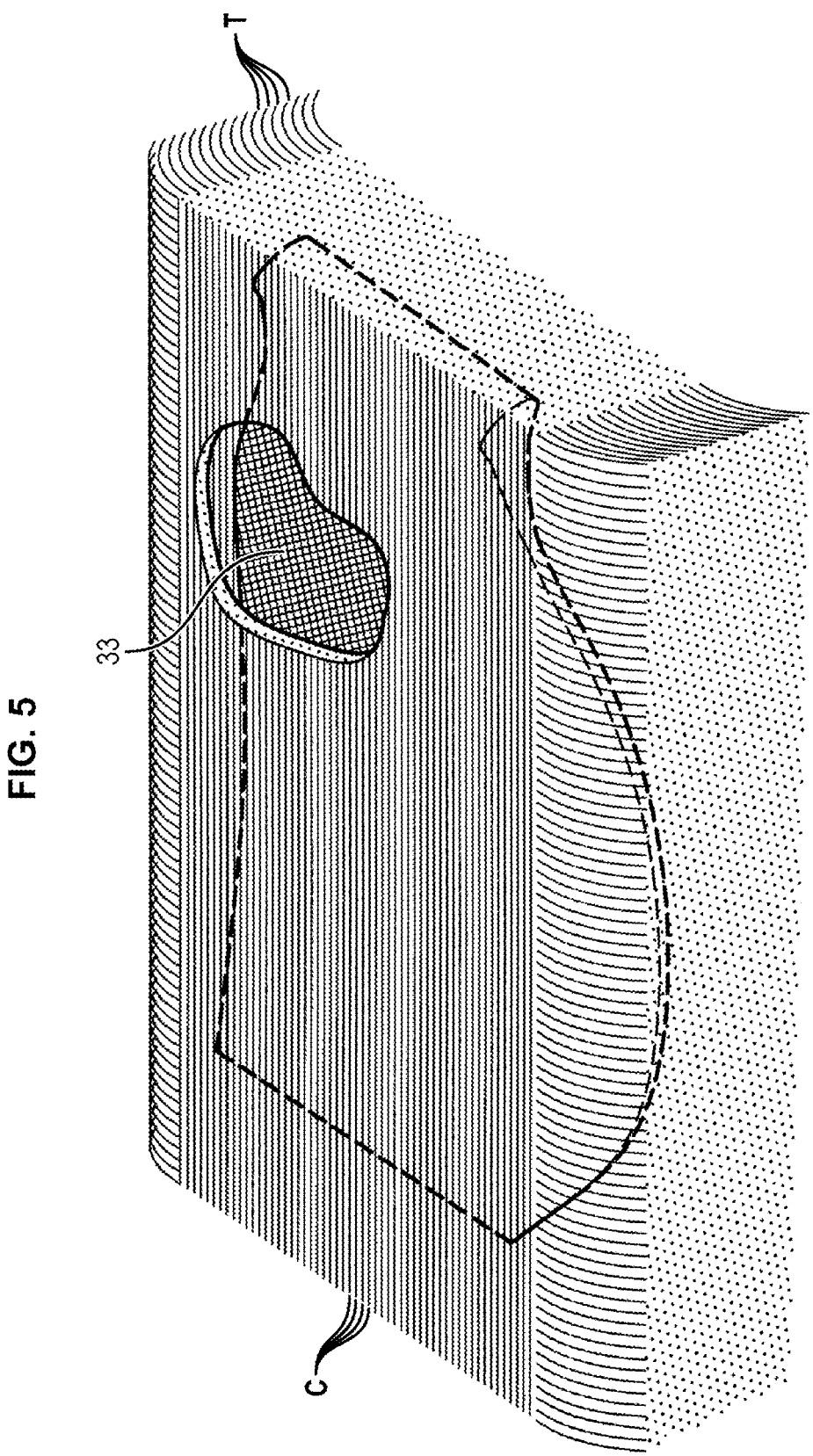
FIGS. 5 and 6 schematically illustrate an exemplary embodiment of the three-dimensional weaving on a loom of a fibrous reinforcement for a blade according to an embodiment of the invention.

As illustrated in FIG. 2, the fan 3 further comprises an actuating mechanism 8 for collectively modifying the pitch angle of the blades of the rotors, in order to adjust the performance of the engine to different flight phases. For this purpose, each blade 7 comprises an attachment part 9 (or hub) disposed at the blade root. The attachment part 9 is mounted to rotate relative to the hub 6 about a pitch axis Y. More precisely, the attachment part 9 is mounted to rotate inside a housing 10 provided in the hub 6, by means of balls 11 or other rolling elements.

The actuating mechanism 8 comprises an actuator 12 comprising a body 13 fixed to the hub 6 and a rod 14 capable of being driven in translation relative to the body 12. The actuating mechanism 8 further comprises an annular slide 15 mounted integral with the rod 14 and a pin 16 mounted integral with the attachment part 9. The pin 16 is able to slide in the slide 15 and to rotate relative to the slide 15, so as to convert a translation movement of the rod 14 into a rotary movement of the attachment part 9, and consequently a rotary movement of the blade 7 relative to the hub 6 about its pitch axis Y.

The fan blade 7 comprises a structure made of composite material 17, an attachment part 9 of the blade root 22, two locking parts 19 and a cover 31.

The structure made of composite material 17 comprises a fibrous reinforcement 33 obtained by three-dimensional weaving and a matrix 34 in which the fibrous reinforcement 33 is embedded.

The fibrous reinforcement can be formed from a fibrous preform in a single piece obtained by three-dimensional weaving or multi-layered with scalable thickness. In particular it can comprise carbon, glass, aramid and/or ceramic fibres. The matrix which coats the yarns of the fibrous reinforcement 33 is typically a plastic material, typically a polymer, for example epoxide, bismaleimide or polyimide, or a carbon matrix. The blade 1 is then formed by moulding by means of a vacuum resin injection method of the "Resin Transfer Moulding" (RTM) type, or even of the "Vacuum Resin Transfer Moulding" (VARRTM) type.

The fibrous reinforcement 33 is woven such that it comprises warp yarns which extend continuously both inside the aerofoil portion 21 with aerodynamic profile and inside the blade root portion 22.

The structure made of composite material 17 comprises an aerofoil portion 21 with aerodynamic profile and a blade root portion 22. The aerofoil portion 21 with aerodynamic profile is able to be placed in an air flow, when the engine is in operation, in order to generate lift. The blade root portion 22 is intended to allow the fixing of the structure made of composite material 17 to the attachment part 9.

The blade root portion 22 is connected continuously to the aerofoil portion 21. The blade root portion 22 has a thickness which increases when moving along the portion away from the aerofoil portion 21 with aerodynamic profile.

The attachment part 9 is made of metal, for example made of martensitic steel. The attachment part 9 comprises a wall 25 having an outer surface 26 having a rotationally symmetric shape. The outer surface 26 has two circular grooves 27 able to form raceways for balls 11 or other rolling elements.

The wall 25 of the attachment part 9 delimits a cavity 28 configured to house the blade root portion 22 of the structure made of composite material 17. The wall 25 has a first opening 29 in the general shape of a rectangle through which the structure made of composite material 17 extends, so that the aerofoil portion 21 is located outside the attachment part 9. The attachment part 9 also has a second opening 30, larger than the first opening 29 and located under the blade root portion 22, on an opposite side of the attachment part 9 relative to the first opening 28. If necessary, this second opening 30 can be circular.

The attachment part 9 further comprises a shoulder 10 extending into the cavity 28 from the wall 25. The shoulder 10 can, in particular, be obtained by machining the inner surface of the wall 25. The shoulder 10 extends along the inner periphery of the wall 25, either continuously, or discontinuously. In an embodiment, the shoulder 10 is discontinuous and comprises two separate sections extending opposite one another, for example opposite the blade root portion 22 which extends in the extension of the pressure-face and suction-face walls of the blade 7.

The shoulder 10 has an upper surface 10a facing the first opening 29, a lower surface 10b facing the second opening 30 and a radial surface 10c extending towards the blade root portion 22.

Figure 7:
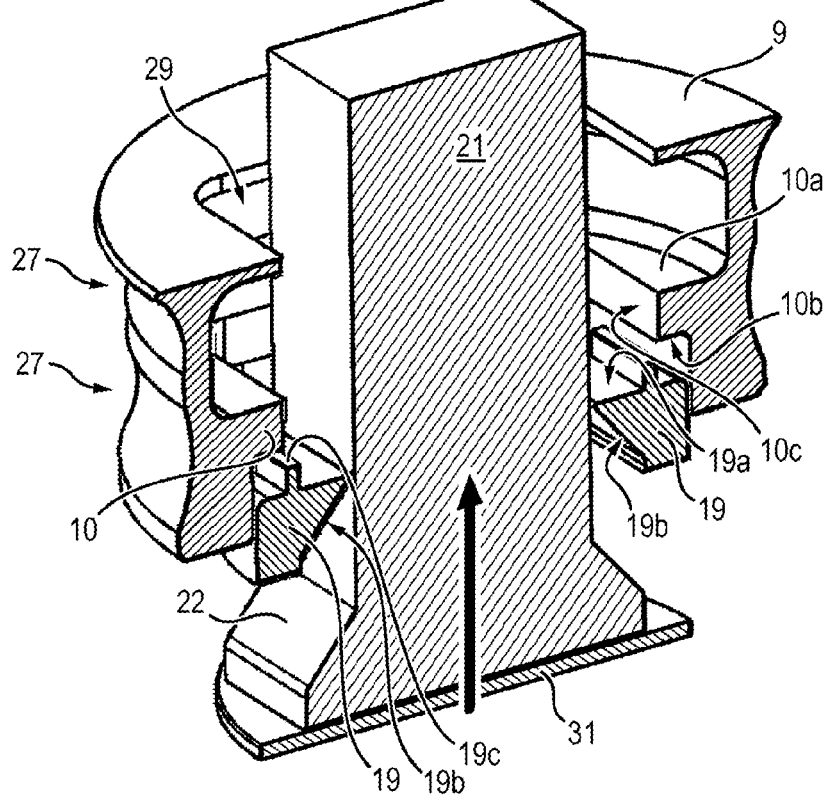
FIGS. 7 and 8 schematically illustrates the mounting of a fan blade according to a second embodiment.
Figure 8:
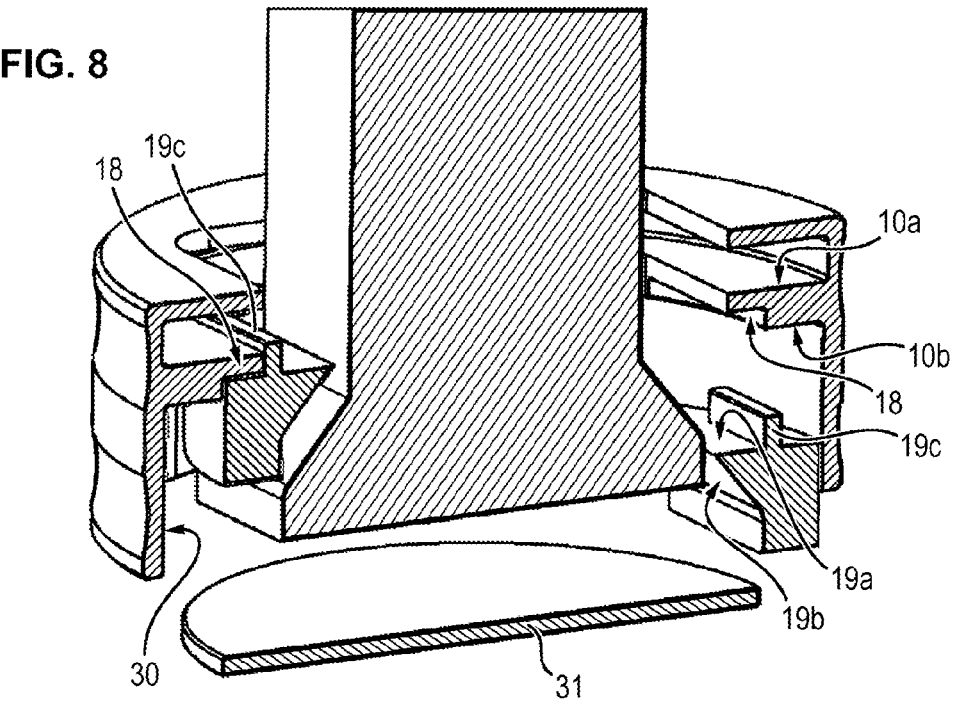
Figure 9:
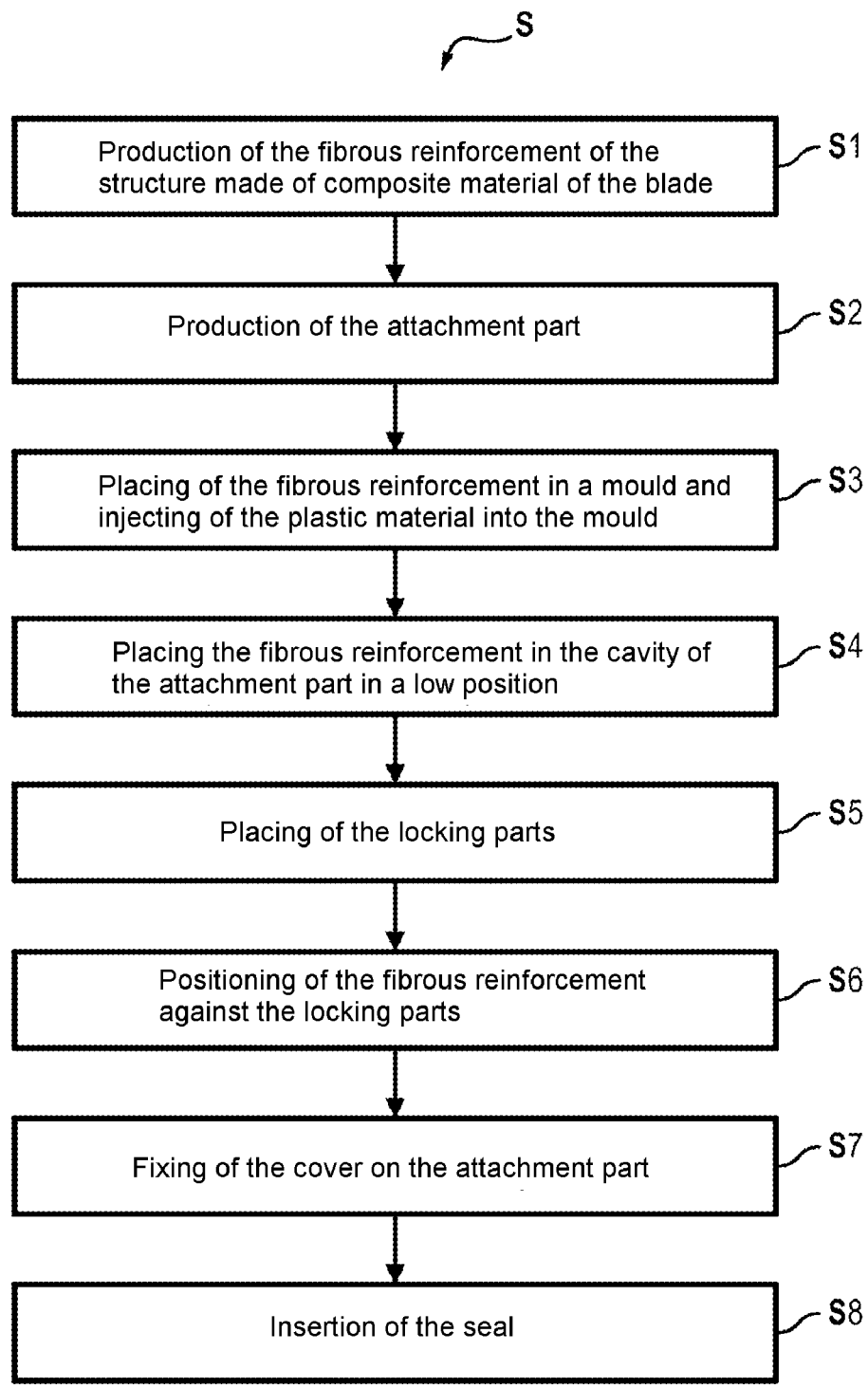
FIGS. 9 and 10 are flow diagrams of steps of a method according to a first and second embodiment of the invention.

The locking parts 19 are also disposed inside the cavity 28. They each have an upper surface 19a configured to axially abut against the lower surface 10a of the shoulder 10 (or of the corresponding shoulder section 10) and a lower surface 19b at least partially inclined relative to the upper surface 19a and configured to bear against the blade root portion 22. For this purpose, the angle formed between the upper surface 19a and the inclined lower surface 19b is acute. The lower surface 19b can be substantially planar and inclined over its entire length, in which case the locking parts 19 are substantially triangular. Alternatively, the lower surface 19b can have an inclined radially inner portion (i.e. close to the pitch axis Y) and a radially outer portion (i.e. close to the wall 25) substantially parallel to the upper surface 19a (FIGS. 7 and 8). The upper surfaces 19a of the locking parts 19 thus make it possible to fix the axial position of the locking parts 19 and therefore of the blade root portion 22 relative to the attachment part 9 while the inclined lower surfaces 18b play the role of bearing surface for the blade root portion 22 in order to reconstruct the support necessary for the blade root portion 22 in order to take up the centrifugal forces.

The surface of the inclined portion of the lower surfaces 19b of the locking parts 19 which is in contact with the blade root portion 22 can, if necessary, be adjusted (in particular increased) in order to reduce the caulking pressure.

Each locking part 19 further comprises a tab 19c extending from its upper surface 19a and configured to radially abut against the radial surface of the shoulder 10. The tabs 19c make it possible to fix the angular position of the locking parts 19 relative to the pitch axis Y of the blade 7 and to take up the lateral forces applied by the blade root portion 22 to the locking parts 19. A sliding adjustment between the locking parts 19 and the attachment part 9 facilitates the mounting.

The locking parts 19 are preferably made of metal, for example martensitic steel, aluminium or titanium.

In an embodiment illustrated in FIG. 8, the shoulder comprises a recess 18 formed in its lower surface 10a and configured to receive an associated locking part 19. This recess 18 also makes it possible to reduce the radial size of the locking parts 19 (i.e. their size in a plane normal to the pitch axis Y) by bringing the radial abutment of said locking parts 19 closer to the pitch axis Y. As will be seen below, this gain in radial size of the locking parts 19 makes it possible to lower the structure made of composite material 17 relative to the attachment part 9 during step S4 in order to allow their placing in the cavity 28 or, if necessary, to facilitate this placing.

The fan blade 7 further comprises a cover 31 that can be fixed on the attachment part 9 at the second opening 30 such that the blade root portion 22 is compressed between the cover 31 and the locking parts 19. Hence, the cover 31 exerts, on the blade root portion 22, a constraining force which presses it against the locking parts 19 and presses said locking parts 19 against the shoulder 10, which avoids the risk of swivelling of the blade root.

When the second opening 30 is circular, the cover 31 can, in particular, be fixed by screwing onto the attachment part 9. If necessary, the attachment part 9 further comprises braking means configured to avoid the loosening of the cover 31 in operation. For example, the braking means may comprise a resin applied on the threads of the second opening 30 and/or of the cover 31 and/or a self-locking washer.

The cover 31 is preferably made of metal, for example martensitic steel, aluminium or titanium.

Optionally, the fan blade 7 further comprises means configured to form a radial abutment for the fan blade 7 in the region of its leading edge and/or its trailing edge. These means are positioned in the attachment part 9 between the two locking parts 19.

For example, the abutment-forming means can be obtained by machining the wall 25 of the attachment part 9 and extend globally between the two sections of the shoulder 10. Alternatively, the abutment-forming means may comprise one or two shims placed in the cavity 28, between the two sections of the shoulder 10.

The blade 7 further comprises a seal 20 placed in the first opening 29, between the structure made of composite material 17 and the edge of the first opening 29 which surrounds the structure made of composite material 17. The seal 20 makes it possible to fill the gap remaining between the structure made of composite material 17 and the attachment part 9 at the first opening 29.

The seal may, in particular, comprise an elastomer material, for example at least one of the following materials: an ethylene-propylene copolymer (EP or EPM) and ethylene-propylene-diene terpolymer (EPDM), a fluorosilicone (FVMQ) or any other silicone-based elastomer such as silicone-based vinyl methyl silicone (VMQ).

FIGS. 5 to 9 illustrate the steps of a manufacturing method S of a fan blade 7 according to a possible embodiment of the invention.

Figure 10:
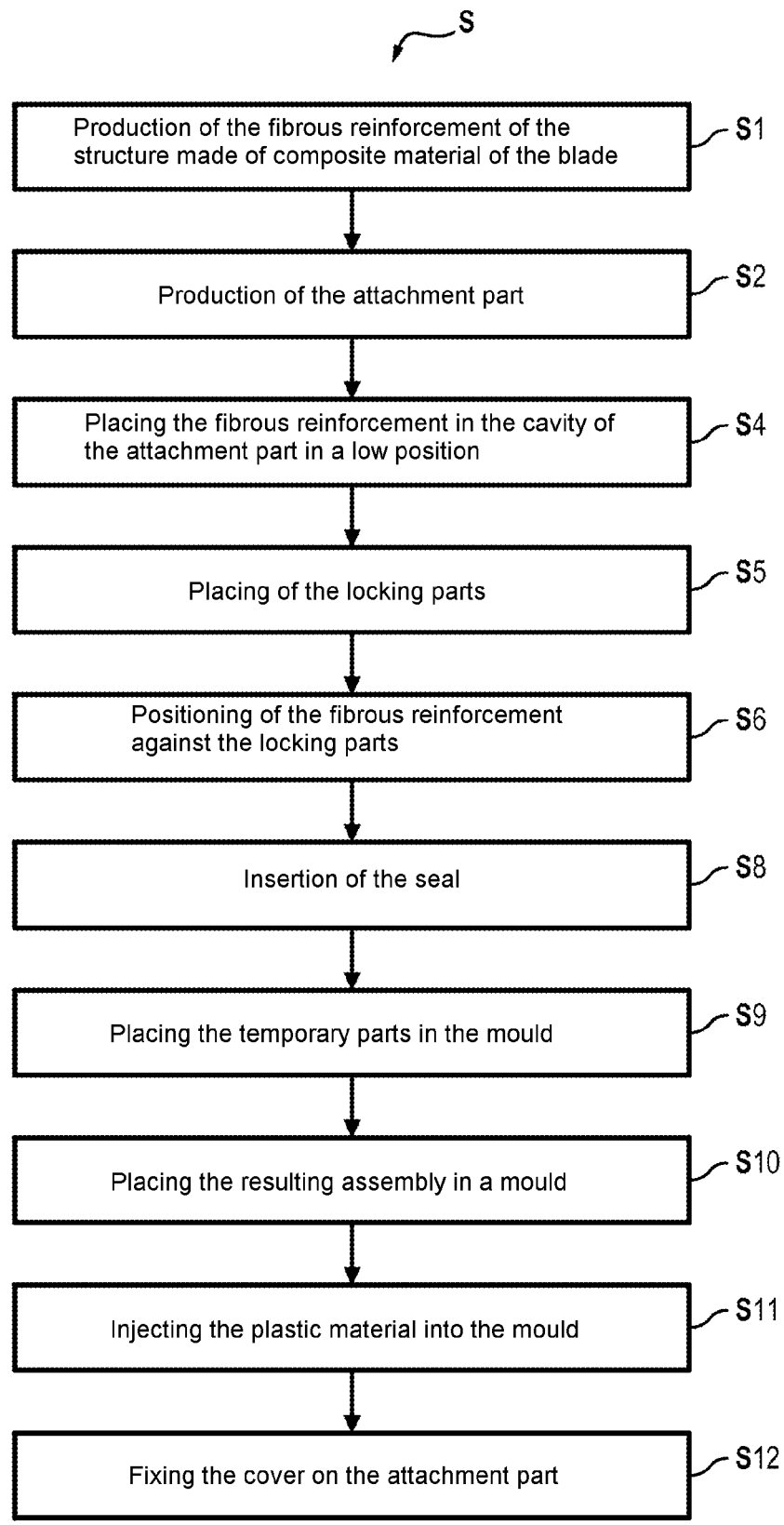

This manufacturing method comprises, in particular, the production of the fibrous reinforcement 33 and its injection with a plastic material in order to obtain the fan blade 7. As will be seen below, the injection step can be performed before placing the fibrous reinforcement 33 in the attachment part 9 (FIG. 9) or, alternatively, after its placement (FIG. 10).

In the first embodiment (FIG. 9), the fibrous reinforcement 33 is produced then consolidated with a matrix (plastic material) prior to its placement in the attachment part 9. Advantageously, the fan blade 7 thus obtained is then removable, which allowed its replacement without damaging the attachment part 9 or removing the entire fan disc.

For this purpose, according to a step S1 (FIG. 5), the fibrous reinforcement 33 is produced by three-dimensional weaving on a jacquard loom. During the weaving, bundles of warp yarns C (or warp strands) are deposited in a plurality of layers, each of several hundred yarns. Weft yarns T (or weft strands) are interlaced with the warp yarns C so as to link together the various layers of warp yarns C.

In the illustrated example, the three-dimensional weaving is an "interlock" weave. The term "interlock" designates a weave in which each layer of weft yarns links a plurality of layers of warp yarns with all the yarns of the same weft column having the same movement in the weave plane.

Other known types of three-dimensional weaving can be used, in particular such as those described in the document WO 2006/136755.

Figure 6:
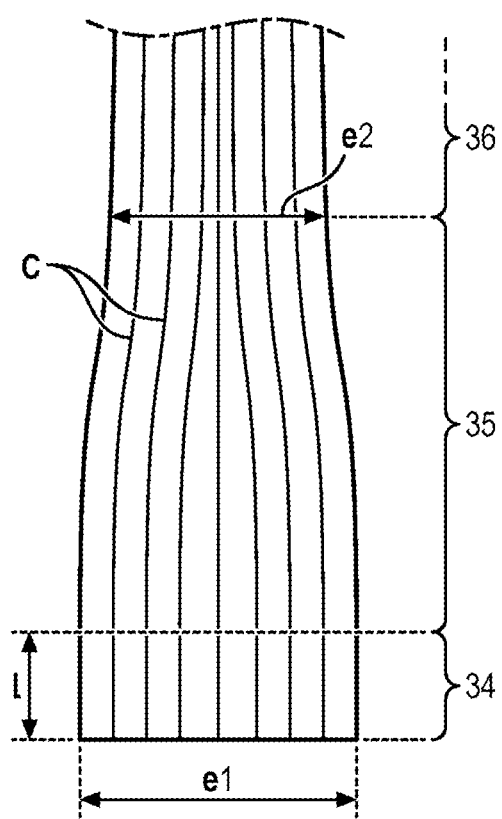

As illustrated in FIG. 6, the step of weaving the raw fibrous reinforcement 33 (or preform) comprises, in succession, weaving a temporary fibrous reinforcement portion 34 (which will later be dropped during the manufacturing method), weaving the blade root fibrous reinforcement portion 35 intended to form the blade root portion 22 then weaving an aerofoil fibrous reinforcement portion 36 intended to form the aerofoil portion 21.

The temporary fibrous reinforcement portion 34 is woven by interlacing all the warp strands C necessary for the production of the fibrous reinforcement 33. Once the weft column has reached a predetermined width I, the aerofoil fibrous reinforcement portion 36 is woven. In this way, the blade root reinforcement portion 35 comprises warp yarns C which extend inside the aerofoil fibrous reinforcement portion 36.

As can be seen in FIG. 6, the blade root fibrous reinforcement portion 35 is woven with successive weft strands T which have different titres, which decrease in the direction of weaving (weaving direction indicated by the arrow), in other words titres which decrease as the aerofoil fibrous reinforcement portion 36 is approached, in order that the blade root fibrous reinforcement portion 35 has inclined flanks. These inclined flanks then bear against the inclined lower surface 19b of the locking parts 19.

It should be reminded that "titre" designates a size characterising the fineness of a yarn: it is defined as the mass of the yarn per unit length. The normalised unit for measuring the titre is the Tex (mass in grams of 1000 metres of yarn) or the Decitex (mass in the grams of 10,000 metres of yarn). Other units can also be used such as the denier, the number metric or even the number English.

In this way, the blade root fibrous reinforcement portion 35 has a thickness that decreases as the aerofoil fibrous reinforcement portion 36 is approached. The blade root fibrous reinforcement portion has a thickness e1 at the blade root and a thickness e2 at the junction with the aerofoil fibrous reinforcement portion 36, less than e1.

Over the course of the weaving of the fibrous reinforcement 33, for which the thickness and the width vary, a certain number of warp yarns C are not woven, which makes it possible to define a desired continuously variable contour, width and thickness of the fibrous reinforcement 33.

The warp yarns C and the weft yarns T located at the limit of the woven mass (called "floats") are also cut so as to extract the fibrous reinforcement 33 (FIG. 8).

Then, the finished fibrous reinforcement is obtained by performing a trimming ("contouring") of the preform. Contouring refers to cutting of the flat preform along the leading edge, the trailing edge and the tip (leaving excess lengths on these three cuts). A contouring is so performed along the lower duct and on the lateral surfaces of the blade root portion.

In addition, the temporary fibrous reinforcement portion 34 is cut in order to be removed. The contouring and cut of the blade root portion can be performed with a pressurised water jet.

According to a step S2, the attachment part 9 is produced, for example by machining, in order to form the cavity 28, the first opening 29, the second opening 30, the shoulder 10 and if necessary a thread at the second opening 30 in order to allow screwing of the cover 31.

According to a step S3, the fibrous reinforcement 33 is placed in a mould having a cavity having the shape of the final moulded part (namely the fan blade 7) and the plastic material (called "matrix") is injected into the mould so as to impregnate the entire fibrous reinforcement 33. The injecting of plastic material can be performed by an RTM or VARRTM injection technique. The injected plastic material is, for example, a thermosetting liquid composition containing an organic precursor of the matrix material. The organic precursor usually has the form of a polymer, such as a resin, optionally diluted in a solvent.

In a manner known per se, the plastic material is dated in such a way as to cause polymerisation of the plastic material, for example by cross-linking. For this purpose, the mould is placed in an oven. The part obtained is next removed from the mould and then contoured by machining the leading edge, the trailing edge and the tip of the aerofoil in order to remove the excess length and to obtain a part having the desired shape and thus meeting the aerodynamic constraints, despite a possible retraction of the fibres of the reinforcement 33 during polymerisation of the plastic material. The lower portion of the blade is also machined. If necessary, the contouring can be performed at the end of the method S.

The reinforcement 33 impregnated with plastic material constituting the matrix 34 forms the structure made of composite material 17 of the blade 7.

According to a step S4, the structure made of composite material 17 is placed in the attachment part 9 through the first opening 29 so that the aerofoil portion (which comprises the aerofoil fibrous reinforcement portion 36) is located outside the attachment part 9, beyond the first opening 29, and so that the blade root portion 22 (which comprises the blade root fibrous reinforcement portion 35) is located outside the attachment part 9, beyond the second opening 30. In other words, the structure made of composite material 17, which comprises the fibrous reinforcement 33, is inserted via the first opening 29 of the attachment part 9 but is placed in a relatively lower position to the attachment part 9 than its final position so as to project from the second opening 30.

At this step, the structure made of composite material 17 is not held in the attachment part 9.

According to a step S5, the locking parts 19 are placed in the cavity 28 such that their upper surface 19a axially abuts against the lower surface 10b of the shoulder 10 and such that, if necessary, their tab 19c radially abuts against the radial surface 10c of the shoulder 10. The locking parts 19 are thus positioned angularly, axially and radially in the attachment part 9.

The introduction of the locking parts 19 is facilitated, in particular, by the lowering of the structure made of composite material 17 in step S3, which frees up an insertion space between the second opening 30 and the blade root portion 22. This introduction is further facilitated when recesses 8 are formed in the shoulder 10, the locking parts 19 being radially smaller.

According to a step S6, the structure made of composite material 17 is remounted in the attachment part 9 towards the first opening 29 until bearing against the inclined lower surface 19b of the locking parts 19.

If necessary, one or more shims are also inserted in the cavity 28 so as to form a radial abutment for the portion of the blade root reinforcement extending in the extension of the leading edge and/or the trailing edge of the structure made of composite material 17.

Optionally, the remaining voids in the cavity 28 of the attachment part 9, in particular between the first opening 29 and the shoulder 10 and/or between the locking parts 19 and the cover 31, can be filled with foam 40. The foam 40 thus protects the blade 7 against the ingress of dust, water, ice, etc. and, if necessary, holds the blade 7 in position in the attachment part 9. For this purpose, the foam 40 is chosen so as to have a stiffness on the order of several GPa. The foam may comprise, for example, polymethacrylimide (PMI).

According to a step S7, the cover 31 is fixed on the attachment part at the second opening by compressing the blade root portion 22 between the cover 31 and the locking parts 19. In particular, the cover 31 is fixed so that it exerts a compression force on the blade root portion 22, which constrains the blade root portion 22 against the locking parts 19 and presses it against the shoulder 10.

According to a step S8, the seal 20 is inserted in the first opening 29. Of course, it will be understood that the step S8 can be performed before step S7.

In a second embodiment (FIG. 10), the fibrous reinforcement 33 is only consolidated with a matrix (plastic material) after its placement in the attachment part 9.

For this purpose, the fibrous reinforcement is woven and the attachment part 9 is machined in accordance with steps S1 and S2 described above. Then, the fibrous reinforcement 33 is placed in the attachment part 9, the locking parts 19 are placed against the shoulder 10, the fibrous reinforcement 33 is remounted bearing against the locking parts 19, the foam 40 is optionally introduced into the cavity 28 in order to fill the voids and the seal 20 is inserted in the first opening 29, in accordance with steps S4 to S6 and S8 described above.

At this stage, the fibrous reinforcement 33 is therefore not yet consolidated and the cover 31 is not fixed on the second orifice 30.

Optionally, in order to hold the fibrous reinforcement 33 in position in the attachment part 9 with a view to its consolidation with the plastic material, temporary parts for holding in position the fibrous reinforcement 33 can be positioned in the attachment part 9 against the root reinforcement portion 35 (step S9). Furthermore, the temporary protective pieces can be placed at the second opening 30 in order to protect the means for fixing the cover 31 and to protect their coating by the plastic material.

Then, according to a step S10, the resulting assembly comprising the fibrous reinforcement 33, the attachment part 9, optionally the foam 40, the locking parts 19, the seal 20 and the optional temporary parts, is placed in a mould having a cavity having the shape of the final moulded part (namely, the fan blade 7).

According to a step S11, the plastic material is injected into the mould in such a way as to impregnate the entire fibrous reinforcement 33. The injection of plastic material can be performed in accordance with the step S3 described above. The reinforcement 33 impregnated with plastic material constituting the matrix 34 forms the structure made of composite material 17 of the blade 7.

According to a step S12, the temporary parts are withdrawn and the cover 31 is fixed on the attachment part 9 at the second opening 30 by compressing the blade root portion 22 of the structure made of composite material 17 between the cover 31 and the locking parts 19. In particular, the cover 31 is fixed so that it exerts a compression force on the blade root portion 22, which constrains the blade root portion 22 against the locking parts 19 and presses it against the shoulder 10.

The invention claimed is:

1. A blade comprising:
a structure made of composite material comprising a fibrous reinforcement obtained by three-dimensional weaving and a matrix in which the fibrous reinforcement is embedded, the structure made of composite material comprising an aerofoil portion and a blade root portion;
an attachment part comprising a wall delimiting a cavity, a first opening and a second opening being formed in the wall, the second opening located under the blade root portion on an opposite side of the attachment part relative to the first opening, wherein the structure made of composite material extends through the first opening such that the aerofoil portion is located outside the attachment part and the blade root portion is located inside the cavity, the attachment part further comprising a shoulder extending from the wall into the cavity, a recess being formed in the shoulder;
two locking parts housed in the recess, each locking part having an upper surface configured to axially abut against the shoulder and a lower surface inclined relative to the upper surface and configured to bear against the blade root portion; and
a cover, fixed on the attachment part at the second opening such that the blade root portion is compressed between the cover and the locking parts.

2. The blade according to claim 1, wherein the locking parts bear against the recess.

3. The blade according to claim 1, wherein the shoulder has a radial surface extending opposite the blade root portion and each locking part comprises a tab extending from an upper surface of the locking part, each tab being configured to radially abut against the radial surface of the shoulder.

4. The blade according to claim 1, wherein the fibrous reinforcement comprises an aerofoil fibrous reinforcement portion and a blade root fibrous reinforcement portion, and wherein each blade root fibrous reinforcement portion is woven continuously with the aerofoil fibrous reinforcement portion.

5. A gas turbine engine comprising a fan, the fan comprising a hub and blades according to claim 1 extending radially from the hub, each blade being mounted to rotate relative to the hub about a respective pitch axis, the gas turbine engine further comprising an actuating mechanism controllable to rotate the blades about their respective pitch axes in such a way as to change a pitch angle of the blades.

6. An aircraft comprising the gas turbine engine according to claim 5.

7. A manufacturing method comprising the steps of:
producing an attachment part comprising a wall delimiting a cavity and a shoulder extending from the wall into the cavity, a recess being formed in the shoulder, wherein a first opening and a second opening are formed in the wall, the second opening located on an opposite side of the attachment part relative to the first opening;
placing a fibrous reinforcement obtained by three-dimensional weaving in the attachment part through the first opening so that an aerofoil fibrous reinforcement portion of the fibrous reinforcement is located outside the attachment part, beyond the first opening, and so that a part of a blade root fibrous reinforcement portion of the fibrous reinforcement is located outside the attachment part, beyond the second opening;
placing locking parts in the recess such that an upper surface of the locking parts axially abuts against the shoulder;
positioning the fibrous reinforcement such that the blade root fibrous reinforcement portion is located inside the attachment part and bears against an inclined lower surface of the locking parts, and
fixing a cover on the attachment part at the second opening by compressing the blade root portion between the cover and the locking parts so as to obtain a blade.

8. The manufacturing method according to claim 7, further comprising, prior to the placement step, a step of placing the fibrous reinforcement in a mould and injecting plastic material into the mould so as to form a structure made of composite material comprising the fibrous reinforcement and a matrix in which the fibrous reinforcement is embedded.

9. The manufacturing method according to claim 7, further comprising, prior to the fixing step, a step of placing an assembly formed of the fibrous reinforcement, the attachment part and the locking parts in a mould and a step of injecting plastic material into the mould so as to form a structure made of composite material comprising the fibrous reinforcement and a matrix in which the fibrous reinforcement is embedded.

10. The method according to claim 9, further comprising a step of placing temporary protective pieces against at least one of the blade root fibrous reinforcement portion and at the second opening prior to placing the assembly in the mould and a step of withdrawing said temporary protective pieces prior to the fixing step.

* * * * *